G. W. STOCKTON.
Wheel Cultivator.
No. 64,721. Patented May 14, 1867.
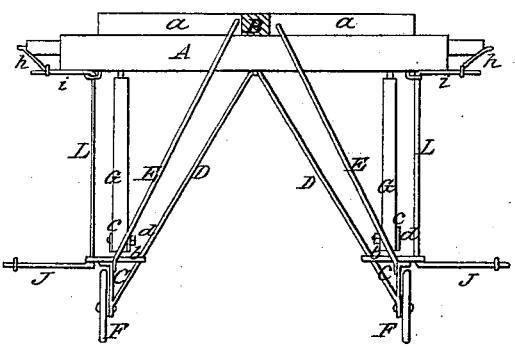
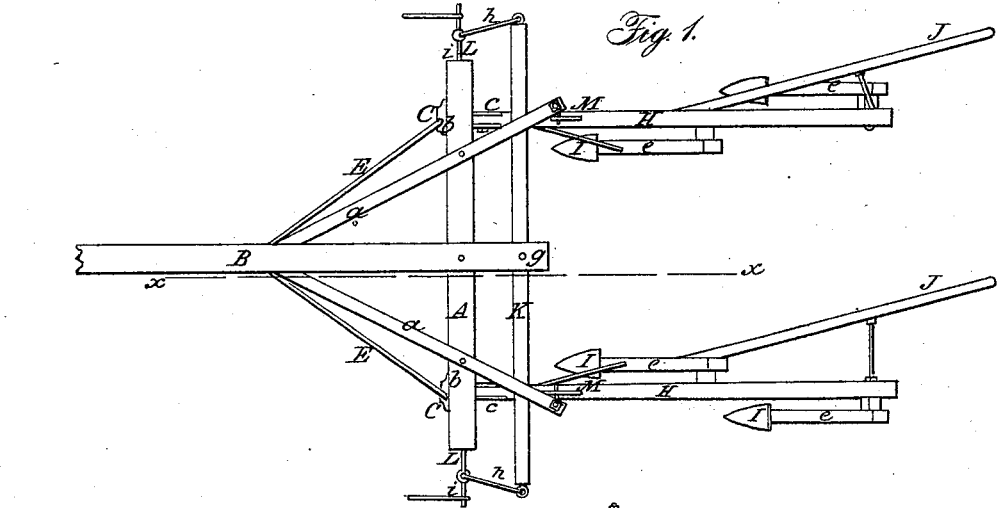
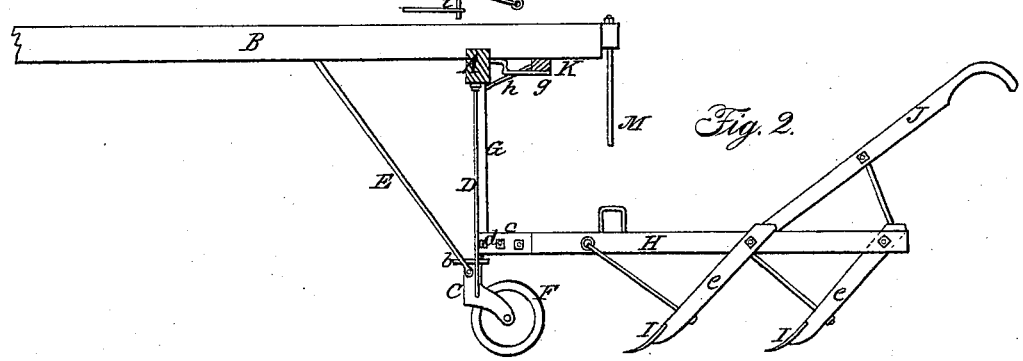
Witnesses:
F. A. Jackson
Wm. Trewin
Inventor:
G. W. Stockton
Per Munn & Co.
Attys

United States Patent Office.

G. W. STOCKTON, OF OQUAKA, ILLINOIS.

Letters Patent No. 64,721, dated May 14, 1867.

IMPROVEMENT IN CULTIVATORS.

*The Schedule referred to in these Letters Patent and making part of the same.*

TO ALL WHOM IT MAY CONCERN:

Be it known that I, G. W. STOCKTON, of Oquaka, in the county of Henderson, and State of Illinois, have invented a new and improved Cultivator; and I do hereby declare that the following is a full, clear, and exact description thereof, which will enable those skilled in the art to make and use the same, reference being had to the accompanying drawings, forming part of this specification, in which—

Figure 1 is a plan or top view of my invention.

Figure 2, a side sectional view of the same taken in the line $x\,x$, fig. 1.

Figure 3, a front view of the same.

Similar letters of reference indicate corresponding parts.

This invention relates to a new and improved cultivator for cultivating crops grown in hills or drills, and it consists in a novel manner of hanging and arranging the plough-beams, as hereinafter fully shown and described, whereby the ploughs are placed under the complete control of the operator and rendered capable of being moved laterally or vertically as occasion may require.

A represents a bar, to which a draught-pole, B, is secured at right angles and braced by hounds $a\,a$, and C C represent two T-shaped plates, which are attached to the lower ends of oblique rods D D, secured to the under side of the bar A at its centre, the rods D diverging from each other from their upper ends downward, as shown clearly in fig. 3. These plates C are braced by rods E from the front ends of the hounds $a\,a$. To the lower part of each plate C, a wheel, F, is attached, and the upper horizontal parts $b$ of the plates C have the lower ends of rods G G stepped in them, the upper ends of said rods being fitted in the bar A. These rods G G are allowed to turn freely, and they have each a plough-beam, H, attached to them by a clevis, $c$, through which and the rods G pivot-bolts $d$ pass. By this arrangement it will be seen that the plough-beams, and consequently the ploughs I, which are attached thereto, may be moved laterally and also raised and lowered or moved vertically. The plough-beams have each two standards $e\,e$ attached, to which the ploughs I are secured, and a handle, J, is attached to each beam. The plough-beams are guided by the driver or operator in walking behind the machine, and it will be seen that the ploughs may be moved laterally to conform to the sinuosities of the rows of plants with the greatest facility, and also raised so as to clear obstructions when required. K represents a double-tree, which is secured by a central bolt, $g$, to the rear end of the draught-pole B, and has its ends connected by links $h\,h$ to the outer ends of the upper parts of bent bars L L; said bars being bent so as to form three sides of a quadrangle, and having their lower bearings on the plates C, and their upper bearings underneath the bar A. The links $h\,h$ are attached near the outer ends of the upper parts $i$ of the bars L, which parts serve as arms or levers, and the lower parts $j$, which are parallel with the upper parts $i$, also serve as arms or levers, and have the whiffle-trees attached to them. The double-tree and bent bars L, arranged as shown, constitute an evener for the draught animals, and it is perfectly free from and independent of the working parts of the machine, so that it cannot in the least interfere with the operation of the same. In drawing the device from place to place, the plough-beams H are suspended on hooks M, attached to the rear ends of the hounds $a\,a$.

Having thus described my invention, what I claim as new, and desire to secure by Letters Patent, is—

The swivel-rods G, in combination with the joint or pivoted clevises $c$, the draught-evening device K, and bent bars L, arranged and operating substantially as described for the purpose specified.

G. W. STOCKTON.

Witnesses:
   G. W. LOFFTUS,
   C. B. MATTHEWS.